United States Patent
Ho

(10) Patent No.: US 12,279,088 B2
(45) Date of Patent: Apr. 15, 2025

(54) ELECTRONIC DEVICE WITH MOVABLE SOUND SOURCE

(71) Applicant: OXTI Pte Ltd, Singapore (SG)

(72) Inventor: Chih-Feng Ho, Singapore (SG)

(73) Assignee: OXTI PTE LTD, Singapore (SG)

(*) Notice: Subject to any disclaimer, the term of this patent is extended or adjusted under 35 U.S.C. 154(b) by 206 days.

(21) Appl. No.: 18/074,543

(22) Filed: Dec. 5, 2022

(65) Prior Publication Data
US 2024/0187784 A1    Jun. 6, 2024

(51) Int. Cl.
*H04R 1/02* (2006.01)
*H04R 1/32* (2006.01)
*H04R 3/00* (2006.01)
*H04N 5/64* (2006.01)

(52) U.S. Cl.
CPC .............. *H04R 1/323* (2013.01); *H04R 1/028* (2013.01); *H04R 3/00* (2013.01); *H04N 5/642* (2013.01); *H04R 2201/025* (2013.01); *H04R 2499/15* (2013.01)

(58) Field of Classification Search
CPC .......... H04R 1/323; H04R 1/028; H04R 3/00; H04R 2201/025; H04R 2499/15; H04N 5/642
USPC ................................................ 381/333, 334
See application file for complete search history.

(56) References Cited

U.S. PATENT DOCUMENTS

| | | | | |
|---|---|---|---|---|
| 5,838,537 A | * | 11/1998 | Lundgren | G06F 1/1688 361/679.27 |
| 6,181,550 B1 | * | 1/2001 | Kim | G06F 1/1688 361/679.06 |
| 6,243,260 B1 | * | 6/2001 | Lundgren | G06F 1/1688 381/87 |
| D916,682 S | * | 4/2021 | Valeur | D14/214 |
| 2010/0158299 A1 | * | 6/2010 | Liu | H04S 3/002 381/334 |
| 2012/0255919 A1 | * | 10/2012 | Jones | F16M 13/02 211/26 |
| 2013/0070944 A1 | * | 3/2013 | Lee | H04R 5/02 381/306 |
| 2014/0321689 A1 | * | 10/2014 | Chen | H04R 1/345 381/387 |
| 2022/0046121 A1 | * | 2/2022 | Mai | H04M 1/026 |
| 2022/0308622 A1 | * | 9/2022 | Hatfield | H04R 3/00 |
| 2024/0098395 A1 | * | 3/2024 | Berry | H04R 1/025 |
| 2024/0179467 A1 | * | 5/2024 | Imahama | H04R 3/12 |

* cited by examiner

*Primary Examiner* — William J Deane, Jr.
(74) *Attorney, Agent, or Firm* — Leong C. Lei

(57) ABSTRACT

An electronic device with a movable sound source includes: an electronic device, providing an audio signal; a movable frame, movably provided on the electronic device; and a sound source, provided on the movable frame and in electronic with the electronic device, the sound source provided with an adjustment circuit, the sound source playing the audio signal, and the audio signal played by the sound source adjusted through the adjustment circuit when the movable frame is moved on the electronic device. Whereby, users can adjust the position of the sound source and also can adjust the audio signal played by the sound source according to individual hearing differences or according to personal preferences, so as to achieve the best hearing experience.

5 Claims, 6 Drawing Sheets

ELECTRONIC DEVICE WITH MOVABLE SOUND SOURCE

(a) TECHNICAL FIELD OF THE INVENTION

The present invention relates to an electronic device, and more particularly to an electronic device with a sound source.

(b) DESCRIPTION OF THE PRIOR ART

Chinese Patent No. CN2678280Y, titled "TV with integrated speakers", as FIG. 1 of the patent shows, includes a sound signal playing device and housing, where the housing includes a middle frame, and the sound signal playing device includes a speaker provided with a speaker, front cover and back cover, where the speaker is fixed inside the front cover, the back cover is a component of the middle frame, and the front cover and back cover are fixed on the middle frame.

However, in the above patent, the position of the speaker is fixed. Since changing the position of the sound source also affects the user's hearing experience, the conventional technology cannot adjust the position of the sound source, and there is still room for improvement.

SUMMARY OF THE INVENTION

To overcome the above disadvantages, the present invention proposes an electronic device with a movable sound source, including: an electronic device, providing an audio signal; a movable frame, movably provided on the electronic device; and a sound source, provided on the movable frame and in electronic with the electronic device, the sound source provided with an adjustment circuit, the sound source playing the audio signal, and the audio signal played by the sound source adjusted through the adjustment circuit when the movable frame is moved on the electronic device, where the movable frame is provided with a trigger, and the trigger is in contact with the electronic device when the movable frame is moved on the electronic device, allowing the trigger to generate a trigger signal to the sound source, where the movable frame is provided with an elastic element and a stopper, and the elastic element press the stopper out of the movable frame, where the electronic device is a TV, notebook computer, all-in-one computer, tablet computer, desktop computer or smartphone, and where the electronic device is provided with a slide rail, the movable frame a slide block, and the slide block is slidably arranged on the slide rail, allowing the movable frame to be movably arranged on the electronic device.

Whereby, users can adjust the position of the sound source and also can adjust the audio signal played by the sound source according to individual hearing differences or according to personal preferences, so as to achieve the best hearing experience.

DETAILED DESCRIPTION OF THE PREFERRED EMBODIMENTS

Figure 1:
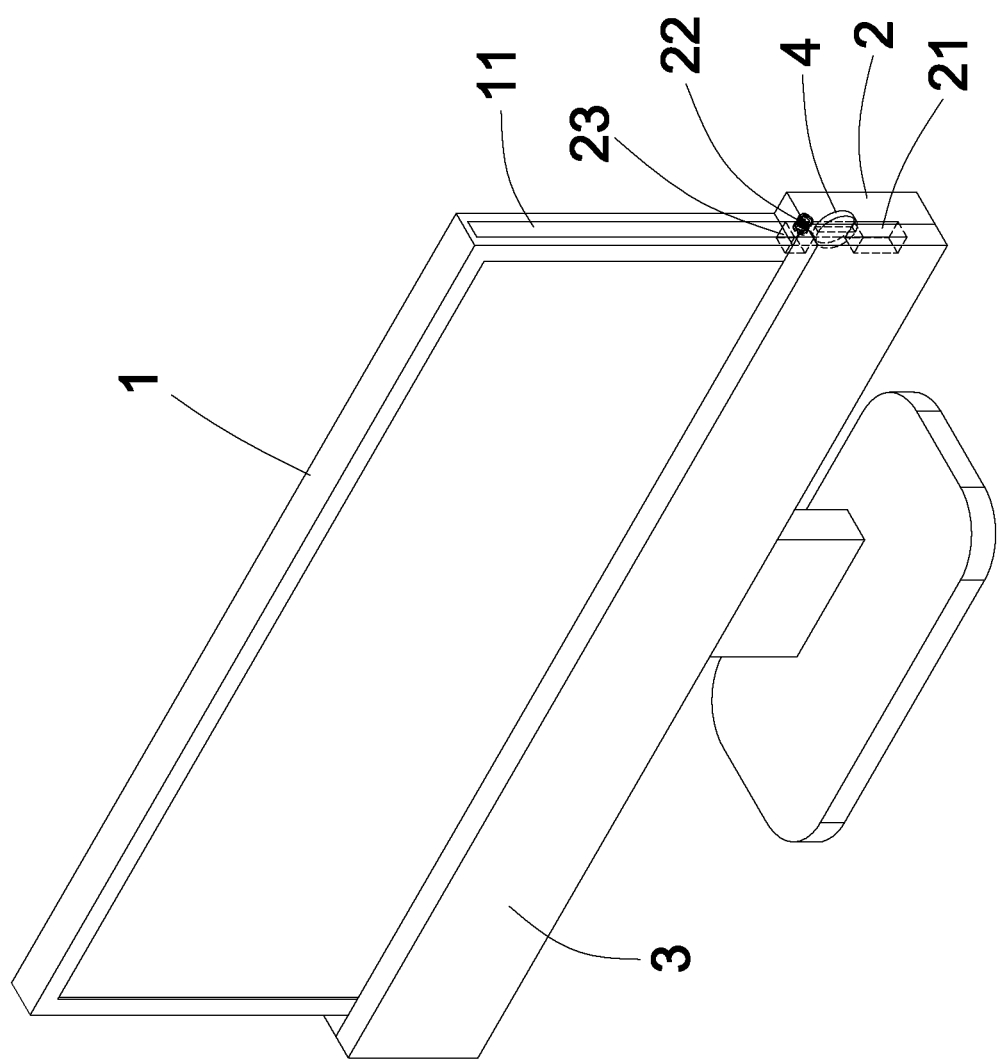
FIG. 1 is a schematically perspective view of an electronic device with a movable sound source of the present invention.
Figure 2:
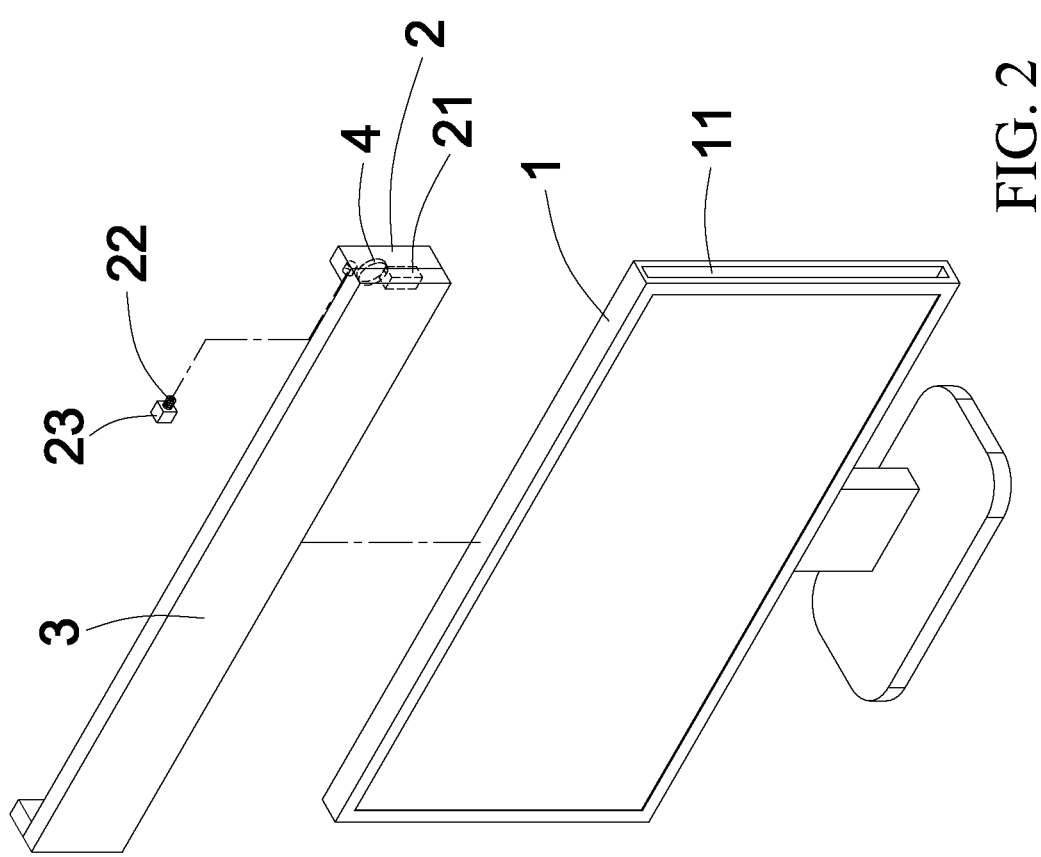
FIG. 2 is an exploded view of the electronic device with a movable sound source of the present invention.

Referring to FIGS. 1 and 2, an electronic device with a movable sound source of the present invention includes an electronic device 1, movable frame 2 and sound source 3.

The electronic device 1 provides an audio signal. The electronic device 1 may be a TV, notebook computer, all-in-one computer, tablet computer, desktop computer or smartphone. Taking TV as an example, the audio cable or other type of audio transmission cable is connected to the audio output jack of the TV to obtain the audio signal of the TV.

Figure 3:
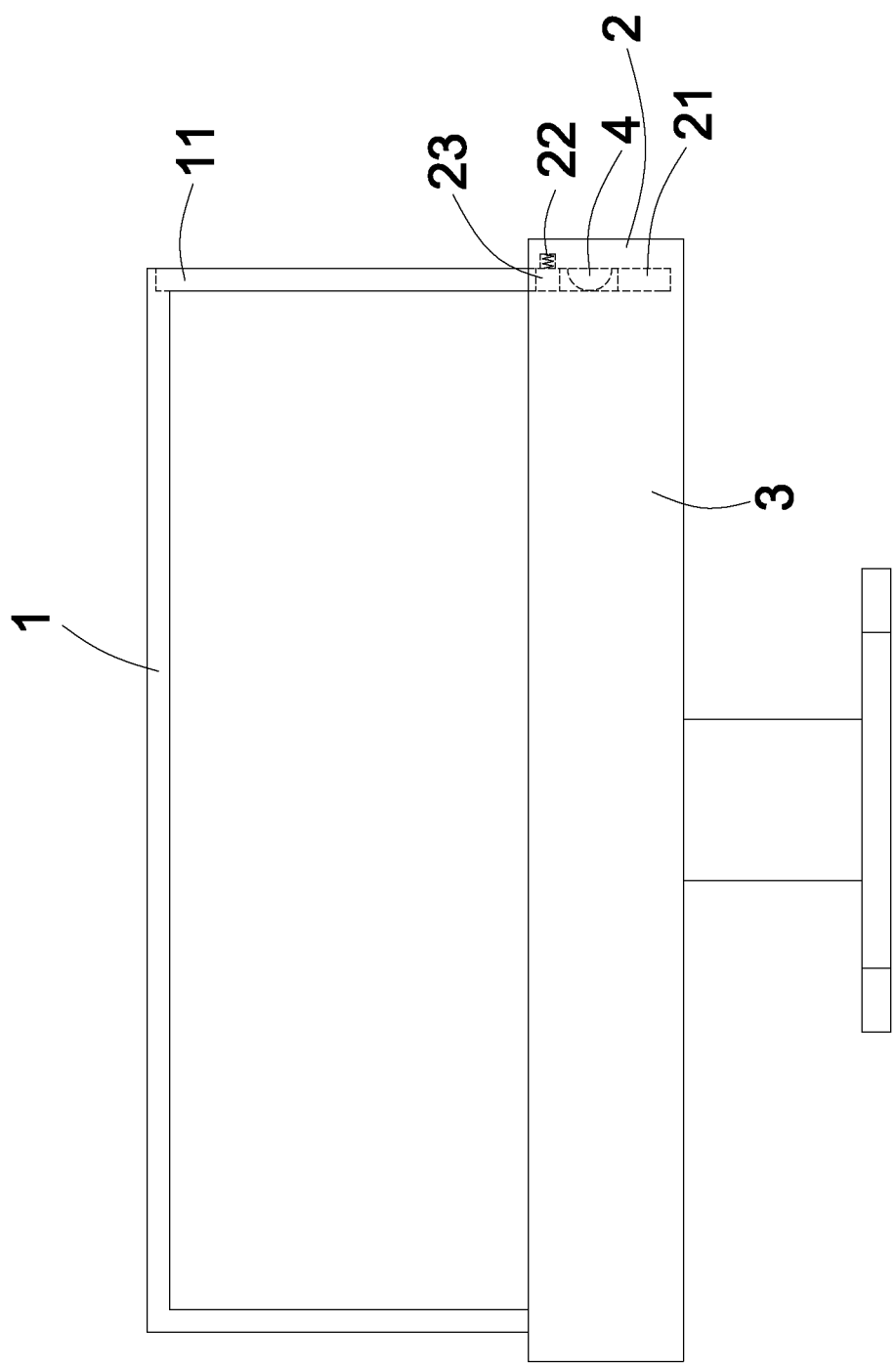
FIG. 3 is a front view of the electronic device with a movable sound source of the present invention.

Referring to FIGS. 2 and 3, the movable frame 2 is movably configured on the electronic device 1. In a preferred embodiment, the movable frame 2 is a hollow frame formed by connecting a plurality of plates in sequence, where a space is formed inside the hollow frame; the electronic device 1 is configured in the space. The electronic device 1 may be provided with a slide rail 11, and the movable frame 2 may be provided with a slide block 21, the slide block 21 is slidably arranged on the slide rail 11, so that the movable frame 2 is movably arranged on the electronic device 1, but the present invention is not so limited. The movable frame 2 may be provided with an elastic element 22 and stopper 23, where the elastic element 22 is adapted to press the stopper 23 out of the movable frame 2, allowing the stopper 23 to press against the electronic device 1, preventing the movable frame from dropping down. The elastic element 22 may be a spring, and the stopper 23 a convex block.

Figure 4:
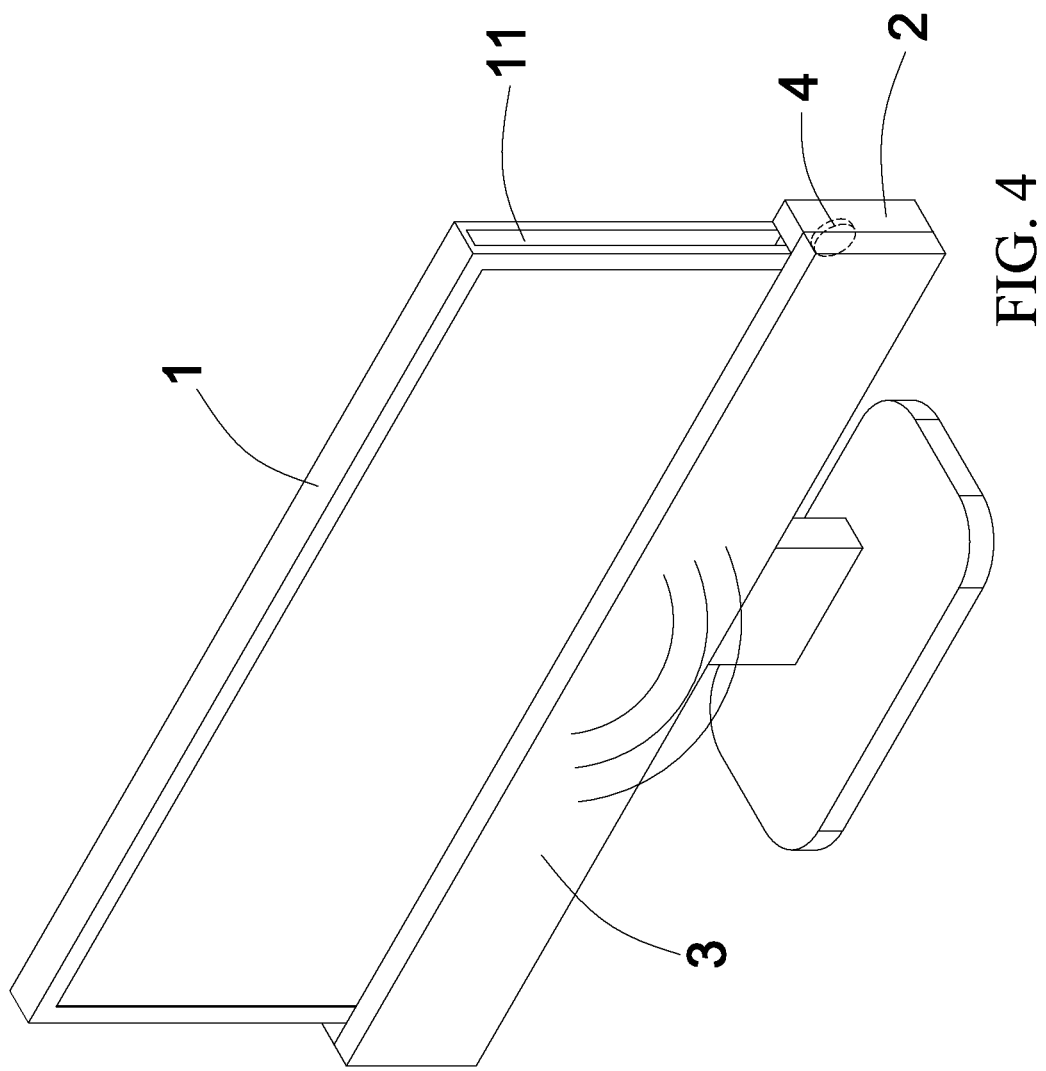
FIG. 4 shows the sound source playing an audio signal according to the present invention.
Figure 5:
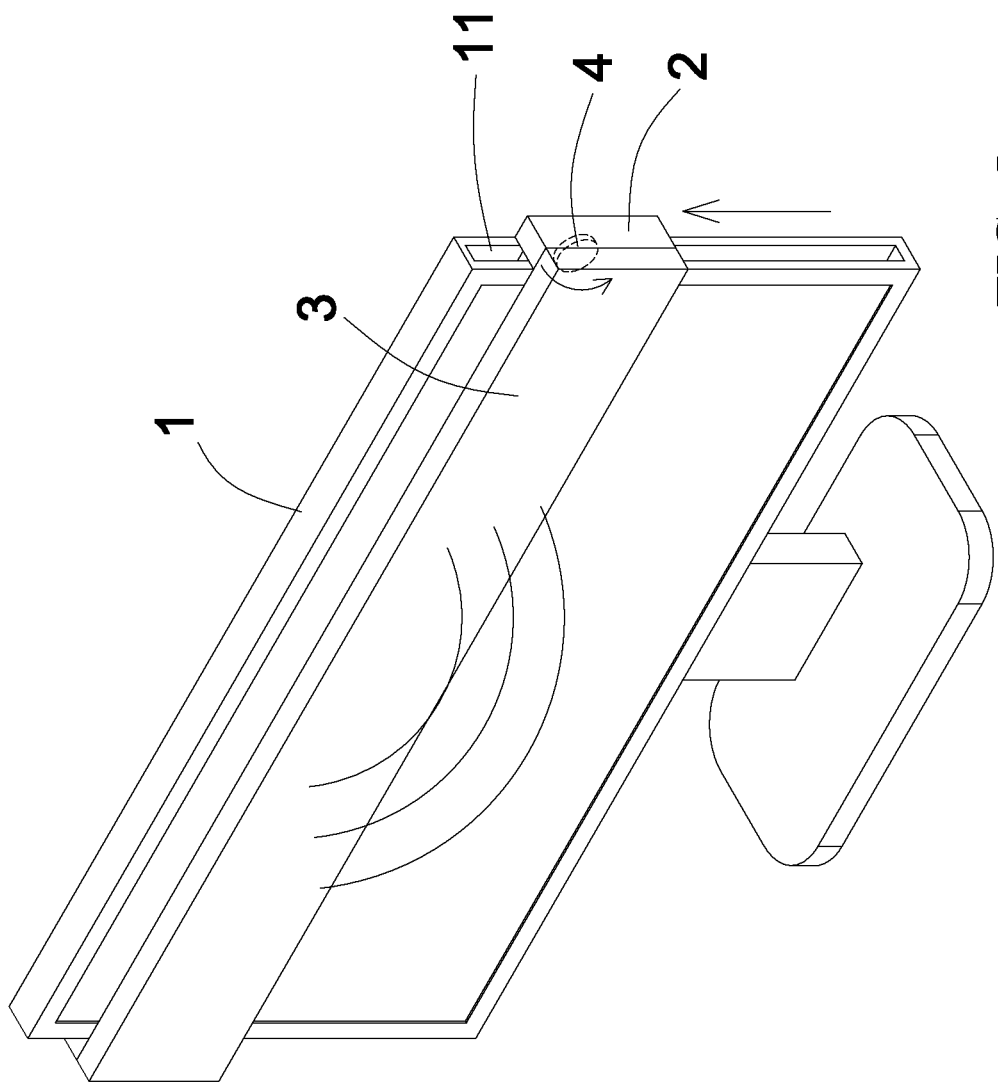
FIG. 5 shows a movable frame being moved according to the present invention.
Figure 6:
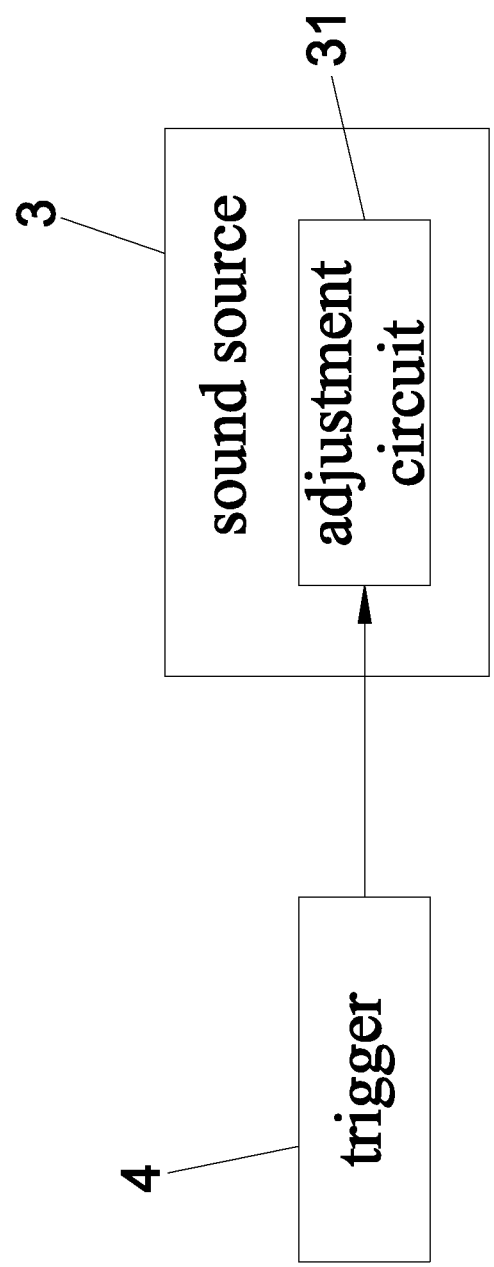
FIG. 6 is a block diagram of the circuit of the sound source and a trigger of the present invention.

Referring to FIGS. 4 and 5, the sound source 3 is configured on the movable frame 2, and in electric connection with the electronic device 1. The sound source 3 is provided with an adjustment circuit 31 (as shown in FIG. 6); when the movable frame 2 is moved on the electronic device 1, the sound source 3 can play the audio signal, and audio signal played by the sound source 3 is adjusted through the adjustment circuit 31. The sound source 3 may be a speaker or any other sound source device having a loudspeaker function. For example, the electronic device is a TV and the sound source 3 is a speaker, and the both ends of the sound source line (or other types of audio transmission lines) are connected to the sound source output hole (terminal) of the TV and the sound source input hole (terminal) of the speaker. Thus, the speaker can then receive the audio signal of the TV and play it.

The movable frame 2 may be provided with a trigger 4; when the movable frame 2 is moved on the electronic device 1, the trigger 4 is in contact with the electronic device 1, allowing the trigger 4 to generate a trigger signal to the sound source 3, and the trigger signal is used to instruct the sound source 3 to adjust the audio signal played by it through the adjustment circuit 31.

The movable frame 2 (or the sound source 3) may be provided with a knob (or button) to use as the trigger 4; when the movable frame 2 is moved on the electronic device 1, the trigger 4 is in contact with the electronic device 1, allowing the trigger 4 to generate a trigger signal to the sound source 3. For example, the trigger 4 is the knob; when the movable frame 2 is moved on the electronic device 1, the knob is in contact with the electronic device 1, allowing the knob to generate a trigger signal to the sound source because the knob forms friction with the electronic device 1 and rotates, and the audio signal played by the sound source 3 is adjusted through the adjustment circuit 31 after the sound source 3 receives the trigger signal.

Referring to FIG. 6, the adjustment circuit 31 can be used to adjust the sound volume or pitch of the audio signal. For example, the adjustment circuit 31 is a bleeder chain, where the bleeder chain is used to attenuate the audio signal, so as to achieve the purpose of controlling the volume.

Referring to FIG. 5 again, for example, the trigger 4 is a knob; when the movable frame 2 is moved upward, the knob forms friction with the electronic device and rotate in a first direction, allowing the knob to generate a first trigger signal to the sound source 3, and the audio signal played by the sound source 3 is adjusted through the adjustment circuit 31 according to the instruction of the first trigger signal after the sound source 3 receives the first trigger signal, causing the sound volume to become larger (or the pitch to become higher).

On the contrary, when the movable frame 2 is moved downward, the knob forms friction with the electronic device 1 and rotates in a second direction, allowing the knob to generate a second trigger signal to the sound source 3, and the audio signal played by the sound source 3 is adjusted through the instruction of the second trigger signal, causing the sound volume to become smaller (or the pitch to become smaller).

Whereby, users can adjust the position of the sound source 3 and also can adjust the audio signal played by the sound source 3 according to individual hearing differences or according to personal preferences, so as to achieve the best hearing experience. The difference between the present invention and the prior arts is that the position of the sound source 3 can be adjusted. Since there is a time difference between sounds at different positions reaching the human ear, the users can obtain different hearing experiences by changing the position and volume (or pitch) of the sound source 3.

I claim:

1. An electronic device with a movable sound source, comprising:
    an electronic device, providing an audio signal;
    a movable frame, movably provided on said electronic device; and
    a sound source, provided on said movable frame and in electronic with said electronic device, said sound source provided with an adjustment circuit, said sound source playing said audio signal, and said audio signal played by said sound source adjusted through said adjustment circuit when said movable frame is moved on said electronic device.

2. The electronic device with a movable sound source according to claim 1, wherein said movable frame is provided with a trigger, and said trigger is in contact with said electronic device when said movable frame is moved on said electronic device, allowing said trigger to generate a trigger signal to said sound source.

3. The electronic device with a movable sound source according to claim 1, wherein said movable frame is provided with an elastic element and a stopper, and said elastic element press said stopper out of said movable frame.

4. The electronic device with a movable sound source according to claim 1, wherein said electronic device is a TV, notebook computer, all-in-one computer, tablet computer, desktop computer or smartphone.

5. The electronic device with a movable sound source according to claim 1, wherein said electronic device is provided with a slide rail, said movable frame a slide block, and said slide block is slidably arranged on said slide rail, allowing said movable frame to be movably arranged on said electronic device.

\* \* \* \* \*